July 28, 1925.                                                                1,547,417
J. McC. EDWARDS
MAGNETO LUBRICATING DEVICE
Filed Oct. 18, 1923

Inventor:
James McCosh Edwards,
By Sprinkle & Smith
Att'ys.

Patented July 28, 1925.

1,547,417

UNITED STATES PATENT OFFICE.

JAMES McCOSH EDWARDS, OF WATERLOO, IOWA, ASSIGNOR TO IOWA DAIRY SEPARATOR COMPANY, A CORPORATION OF IOWA.

MAGNETO-LUBRICATING DEVICE.

Application filed October 18, 1923. Serial No. 669,211.

*To all whom it may concern:*

Be it known that I, JAMES McCOSH EDWARDS, a citizen of the United States, residing at Waterloo, in the county of Black Hawk and State of Iowa, have invented certain new and useful Improvements in Magneto-Lubricating Devices, of which the following is a specification.

This invention relates to lubricating devices, and has as its prime object the provision of a means whereby lubrication of certain parts otherwise inaccessible for lubrication due to their being confined in a relatively small space, may be effectively supplied with lubricant without the necessity of any attention being given to the lubrication of said parts.

It is a feature of the invention to provide a construction capable of lubricating the parts with which it is associated, which will effect the lubrication of said parts entirely by virtue of the lubricant being splashed or similarly caused to reach the lubricating device.

It is another object of the invention to extend a part of the lubricating device into the path of the lubricant, and to construct this portion of the device so that it will convey the lubricant gathered thereby to the parts to be lubricated.

It is a further object to provide a structure whereby the lubricant is prevented from passing between the casing in which the lubricant is confined and certain other portions of the structure, and in addition it is an object to provide a construction whereby any lubricant escaping from the casing will be dispelled and prevented from reaching certain other elements with which the lubricating device is associated, the latter of which are hindered in their proper operation upon contact of oil with certain portions thereof.

It is another object to provide a rotating portion of the structure with the means just referred to so that the action of centrifugal force may be employed to cause any excess or escaping lubricant to be dispelled from the device and its associative mechanism.

It is another object to construct that part of the lubricating device which extends into the path of the lubricant so that it may gather and feed the lubricant to the various parts to be lubricated and also so that the action of centrifugal force applied thereto will cause the lubricant to be fed therefrom to the various parts to be lubricated.

The invention has these and other objects, all of which will be more readily understood when read in conjunction with the accompanying drawings which illustrate one embodiment of which the invention is susceptible, it being obvious that changes and modifications may be resorted to without departing from the spirit of the appended claims forming a part hereof.

In the drawings—

Figure 1:
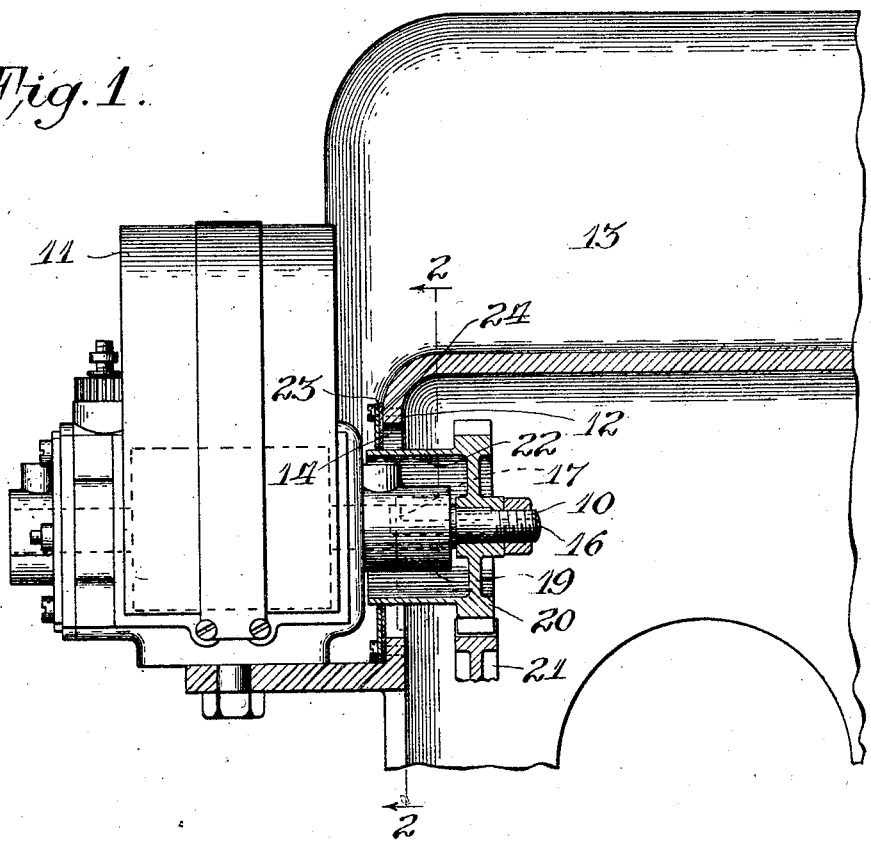
Figure 1 illustrates the device as associated with the casing of an engine and a magneto which co-operates with the engine.
Figure 2:
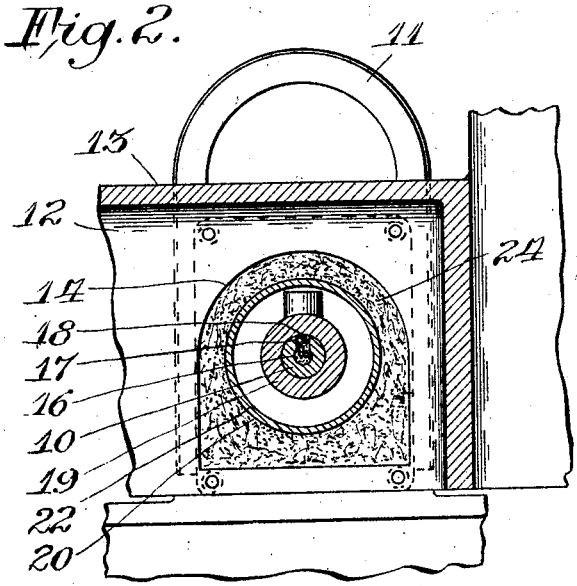
Fig. 2 is a section taken on line 2—2 of Fig. 1.
Figure 3:
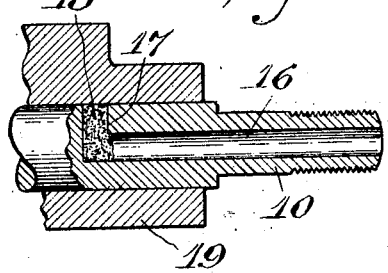
Fig. 3 is a longitudinal sectional view of a part of the structure illustrated in Figs. 1 and 2.

In the embodiment of the invention illustrated in the drawings, the structure is shown as associated with and arranged to lubricate certain parts of the driving mechanism of the magneto of an internal combustion engine, which parts are located between the magneto proper and the casing of the engine with which the magneto is associated. The space usually allotted between the casing and the magneto is ordinarily of a relatively small dimension, which prevents the application of any means for introducing lubricant to these parts of the structure which are therefore neglected, which results in these parts becoming prematurely rendered useless. In many instances the lubricant finds its way out of the casing, and eventually lodges between certain parts of the magneto, such as the magnets or windings and the armature thereof, which it is well known interferes with the proper operation of this element of the structure.

To effect the proper lubrication of the various parts, and particularly the bearing of the magneto shaft, and to prevent oil from lodging between the parts just referred to of the magneto, certain elements are employed and associated with each other. The means for introducing the lubricant to the bearing includes the magneto shaft 10, which extends from the magneto 11 beyond the wall 12 of the casing 13 of the engine, and is arranged above the normal liquid level of the lubricant contained in the casing. The casing 13 is provided with an aperture 14 whereby the magneto shaft 10 and the various elements associated therewith may be removably associated with the casing. The shaft 10 extends into the casing 13 sufficiently to allow portions of the lubricant contained in the casing to enter the bore 16 of the shaft during the agitation of the lubricant. The bore 16 terminates adjacent one end thereof in a laterally extending portion 17, and has confined therein a suitable absorbent 18 which checks the oil in its passage through the bore, yet allows lubricant to pass in sufficient quantity to properly lubricate the bearing 19 of the magneto shaft. The end of the magneto shaft which extends into the engine casing is provided with a gear 20, which cooperates with the gear 21 to cause the armature of the magneto to be driven.

The gear 20 is provided with an annular laterally projecting flange or band 22, which extends through the aperture 14 and surrounds the bearing 19 of the magneto, and is employed to provide means for dispelling any excess oil which may find its way through the aperture or the bearing, and prevents its lodging between the armature of the magneto and other portions thereof, which would interfere with the proper operation of the structure. It is manifest that should any oil accumulate upon the extension either interiorly or exteriorly thereof it would be thrown therefrom through the action of centrifugal force thereon, which will therefore prevent the lubricant from finding its way between the parts of the magneto just referred to.

This extension 22 is surrounded by a plate 23, which is secured to the casing 13 and packed against leakage by means of a suitable gasket 24, which is interposed between the plate and the casing. The plate 23 provides a closure for the aperture 14, which aperture is of a dimension sufficient to allow the removal of the magneto and the gear 20 from the casing as a unit upon the disconnection of the plate from the casing.

From the foregoing explanation of the structure illustrated in the drawings it is evident that a simple and effective structure is provided whereby certain parts of the structure may be lubricated, and also that a means is provided whereby any excess lubricant which may find its way between the parts will be dispelled or directed away from portions of the magneto which might be affected by virtue of oil or other matter coming in contact therewith.

Having thus described the invention, what I claim and desire to cover by Letters Patent is:

1. In a lubricating device, the combination of a shaft having a passage open at one end and terminating interiorly of a casing above the normal liquid level of the lubricant contained in the casing and communicating with the bearing to be lubricated, and an annular member surrounding and driven by the shaft whereby excess lubricant is dispelled from the bearing.

2. In a lubricating device, the combination of a shaft having a passage open at one end and terminating interiorly of a casing above the normal liquid level of the lubricant contained in the casing, a gear mounted upon the shaft, an annular member provided upon the gear for dispelling lubricant from the bearing of the shaft.

3. In a lubricating device, the combination of a shaft having a passage open at one end and terminating interiorly of a casing above the normal liquid level of the lubricant contained in the casing, said casing being apertured adjacent the shaft, an annular member rotatable with the shaft, said annular member being arranged in the aperture and being extended upon opposite sides of the casing, and means surrounding the annular member for preventing the passage of the lubricant between the annular member and the casing.

4. In a lubricating device, the combination of a shaft having a passage open at one end and terminating interiorly of a casing above the normal liquid level of the lubricant contained in the casing and communicating with the bearing to be lubricated, said passage having a laterally extending portion and absorbent provided in said portion wholly above the liquid level in said casing.

5. In a lubricating device, the combination of a shaft having a passage, one end of the shaft terminating interiorly of a casing above the normal liquid level of the lubricant contained in the casing, said casing being apertured to permit the shaft to be extended interiorly of the casing, an annular member carried by and being rotatable with the shaft, said member being arranged in said aperture and being extended upon opposite sides of the wall of the casing at said aperture.

6. In a lubricating device, the combination of a shaft having a passage, one end of the shaft terminating interiorly of a casing above the normal liquid level of the lubricant contained in the casing, said passage having a laterally projecting portion, absorbent provided in said portion, said casing being apertured to permit the shaft to be passed with the casing, an annular member mounted upon and being rotatable with the shaft, the ends of said annular